March 31, 1931. H. J. PETTY 1,799,061
AGRICULTURAL IMPLEMENT
Filed Nov. 30, 1929
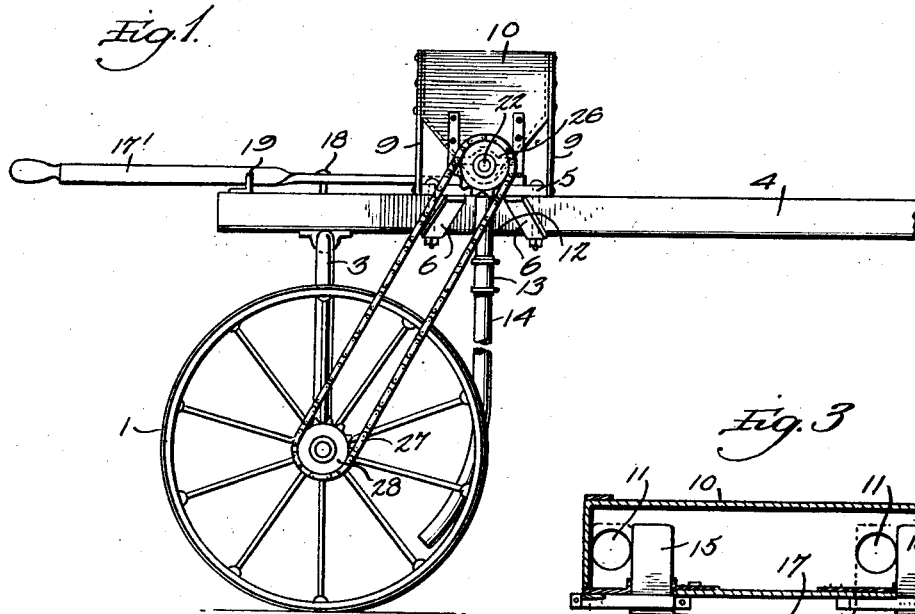
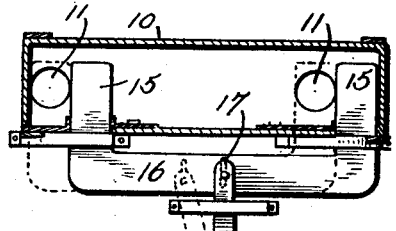
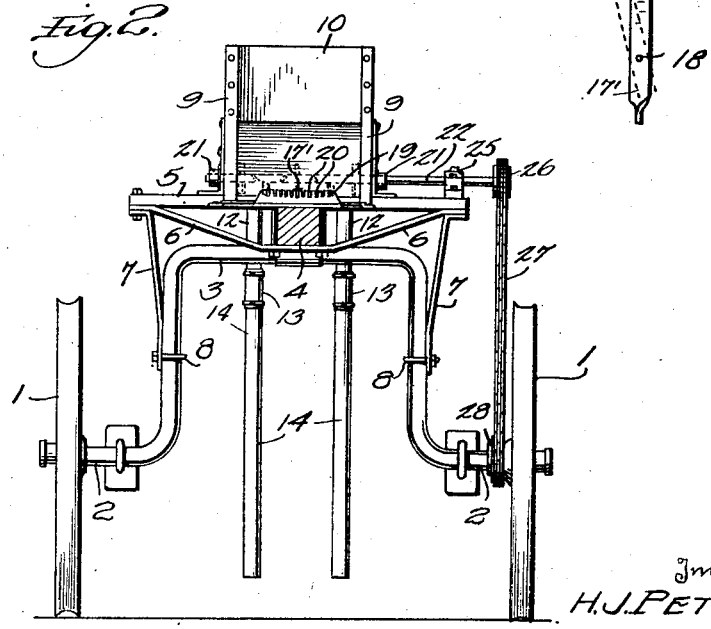
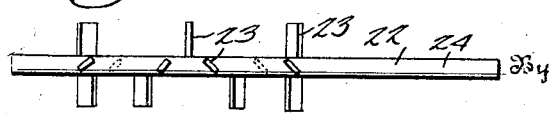
Inventor
H. J. PETTY
By
Attorney Patented Mar. 31, 1931

1,799,061

UNITED STATES PATENT OFFICE

HENRY J. PETTY, OF JACKSON, TENNESSEE

AGRICULTURAL IMPLEMENT

Application filed November 30, 1929. Serial No. 410,847.

My invention relates to improvements in agricultural implements, and one object of my invention is the provision of a fertilizer distributing attachment for plows or cultivators which can be easily adapted to types of such implements in general use to make the plow or cultivator perform the two fold functions of cultivating the soil and fertilizing at one operation.
Another object of my invention is the provision of a fertilizer distributing attachment which can be jointly used with the plow or cultivator, or which may be adjusted to permit the use of either implement, as conditions dictate.

Another object of my invention is the provision of an attachment of the character stated which will distribute the fertilizer to the side of the hills as the implement is drawn over the ground and which can be regulated to supply only the amount of fertilizer required to prevent waste of the fertilizer.

Another object of my invention is the provision of an attachment which can be applied to plows and cultivators in general use with very small changes and which in every respect will be simple, durable, cheap and thoroughly efficient and practical.
With these objects in view my invention consists of an argricultural implement of the character and for the purposes stated, embodying novel features of construction and combination of parts, substantially as described and claimed and as shown in the accompanying drawing, in which:

Figure 1 represents a side view of a machine embodying my invention.

Figure 2 represents a rear end elevation of the machine.

Figure 3 represents a view in horizontal section of the hopper for the fertilizer with the regulating mechanism shown in top plan view, and Figure 4 represents a plan view of the agitator or stirrer which is located in the hopper.

I have shown my invention in connection with a cultivator of common type which has the ground wheels 1, the axles 2, the upstanding vertically disposed yoke shaped frame 3, and the draft tongue 4.

Mounted upon the said tongue is a transverse platform 5, which is rigidly secured to said tongue by the forward and rear brace connections 6, and by the pair of braces 7, which depend from said platform and have their lower ends secured to the yoke shaped frame by the securing means 8, thus rigidly securing the platform to the tongue and in proper relation to the parts of the plow or cultivator.

Upon the platform is supported and secured by the four brackets 9, the hopper 10, in which is placed the fertilizer, and this hopper is provided with the pair of openings 11, which register with the metal tubes 12, connected by coupling means 13, with the discharge spouts 14, which are thus disposed to direct the fertilizer as it passes through the openings in the hopper to each side of the hills as the machine is drawn over the ground.

The said openings of the hopper are closed entirely or their size controlled by means of the cut off, which consists of the pair of covering arms 15 forming a part of the frame 16, to which is connected the inner end 17 of the hand lever, which is fulcrumed at 18 near the hopper and is retained at the desired adjustment by means of the plate 19, formed with a series of notches 20, with which the lever may be engaged to hold the arms of the cut off in proper relation to the openings of the hopper according to the amount of fertilizer which is desired.

Journalled in bearings 21, of the hopper is a shaft 22, which carries the paddles 23, which form the agitator or stirrer to keep the fertilizer in proper condition for use, and this shaft has one end 24, extended and mounted in a bearing 25, and carries at its extreme end a sprocket wheel 26, over which passes a driving sprocket chain 27, which in turn is driven from a sprocket wheel 28, on one of the wheels of the machine, and naturally as the ground wheels revolve the sprocket chain travels and in turn rotates the agitator in the hopper causing the fertilizer to then pass through the feed openings and thence for discharge through the tubes and discharge spouts to the ground.

The machine will combine the functions of cultivating and fertilizing in a single machine at a very low price and thus produce a practical, efficient and desirable farm implement.

An important feature of my invention resides in the placing of the openings in the hopper at each end and in forming the agitator with paddles which are arranged after the manner of a screw in order that they will act to cause the fertilizer to be carried from the center of the hopper at each side and deliver the same into each opening in an even manner to effect proper distribution of the fertilizer.

Another important feature of my invention is the sleeve connection 13 for the spouts 14, as this allows the spouts to be swung to any position desired, or to bring them together to permit sowing seed and fertilizer together, in other words, the machine can be used to plant, as well as to distribute fertilizer, and may be used for both jointly if required, and may also be used either with plows or cultivators, as circumstances dictate.

An important feature of my invention resides in the raised frame and the tongue mounted centrally upon the raised portion of said frame and extended rearwardly to receive the hand lever which operates the cut-off and which is adjustable by means of the plate 19, as this construction allows the driver to follow in rear of the machine and adjust the feed of the material from the hopper to the discharge spouts which is an advantage in a machine of this character.

I claim:

An agricultural implement, consisting of ground wheels, axles upon which said wheels are supported, a frame rising from said axles, a tongue secured to said frame centrally thereof and having its rear end extended beyond said frame, a platform secured upon the upper side of said tongue, a hopper mounted on said platform and having discharge openings, a cut-off having covering arms for controlling said openings, a hand lever connected at its inner end to said cut-off, a plate secured to the rear extension of said tongue and having notches to be engaged by said lever for adjusting said lever, discharge spouts leading from said discharge openings of the hopper, a shaft mounted in said hopper and rotated from one of the ground wheels, and an agitator on said shaft.

In testimony whereof, I affix my signature.

HENRY J. PETTY.